United States Patent [19]

Gilles et al.

[11] 3,793,118
[45] Feb. 19, 1974

[54] APPARATUS FOR MANUFACTURING CONVEYOR BELTS WITH STEEL CABLE INSERTS

[75] Inventors: Martin Gilles, Cologne; Anton Thiel, Garching/Alz, both of Germany

[73] Assignee: Clouth Gummiwerke AG, Cologne, Germany

[22] Filed: Jan. 28, 1972

[21] Appl. No.: 221,570

[30] Foreign Application Priority Data
Feb. 1, 1971 Germany.....................2104501

[52] U.S. Cl.............. 156/436, 100/93 P, 156/137, 156/161, 156/179, 156/494
[51] Int. Cl............................................. B29h 9/00
[58] Field of Search... 156/137, 161, 176, 178, 179, 156/229, 436, 437, 494; 100/93 P; 425/28 B, 34 B

[56] References Cited
UNITED STATES PATENTS
3,684,606  8/1972  Grainger............................ 156/137
2,740,459  4/1956  Kilborn et al....................... 156/436
3,502,535  3/1970  Bongers et al...................... 156/494
3,607,561  9/1971  Hutz et al........................... 156/437
3,345,229  10/1967  Harpfer.............................. 156/494

FOREIGN PATENTS OR APPLICATIONS
1,255,917  12/1967  Germany

Primary Examiner—Daniel J. Fritsch
Attorney, Agent, or Firm—Walter Becker

[57] ABSTRACT

An apparatus for making conveyor belts of rubber with inserts of longitudinally extending steel cables, in which first movable clamping means for selectively firmly grasping sections of the cables to be incorporated in the conveyor belt to be made are arranged between winding-off means for the steel cables and first fixed clamping means, while second movable clamping means are arranged between second fixed clamping means and winding up means for the finished belt, tensioning means being arranged between the first movable clamping means and the first fixed clamping means. Each of all clamping means is adapted selectively firmly to grasp and release the cable means.

8 Claims, 3 Drawing Figures

APPARATUS FOR MANUFACTURING CONVEYOR BELTS WITH STEEL CABLE INSERTS

The invention relates to an apparatus for manufacturing conveyor belts of rubber with an insert of longitudinally extending steel cables. The apparatus comprises a device for applying the rubber on both sides to the tensioned steel cables, a press following the same in the direction of passage of the belt for vulcanizing the belt, two stationary tensioning clamps enclosing the tensioned devices, two further movable tensioning clamps coupled together by a traction element which effects a tension compensation, a tensioning device for the independent tensioning of each individual steel cable, a wind-off device for the steel cable, and a wind-up drum for the vulcanized belt.

An apparatus of this type has previously been disclosed in German Pat. No. 1,255,917. Its principle of operation consists in that the vulcanization of the belt occurs with the fixed clamps closed and with the steel cables equally strongly tensioned. After the vulcanization has been completed, the movable clamps located immediately beside the fixed clamps are closed. Subsequently, the fixed clamps are released and the production section located between the movable clamps is in tensioned condition by the length of a pressing or vulcanization section displaced in the direction of travel of the belt. Simultaneously, a corresponding length of untensioned steel cables is drawn off the winding-off device, the last vulcanized section is drawn out of the press, the next section in the direction of travel which has already previously been covered with rubber, is drawn into the press, and a fresh section in tensioned condition is covered with rubber. During this operation the individual steel cables are in tensioned condition pulled through the tensioning device which maintains them uniformly tensioned. After this advance of the entire arrangement, the fixed clamps are closed and then the movable clamps are opened. Thereupon the section between the fixed clamps is no longer tensioned, since it contains the steel cables which were withdrawn from the winding-off device in untensioned condition. Therefore, the individual wire cables must be tensioned by means of the stationary tensioning device, and only then can the next section be vulcanized in the press. After said next section has been vulcanized, and the movable clamps have been moved in a direction counter to the direction of travel of the belt into proximity of the fixed clamps, the manufacture can be continued section by section in the described manner and as often as desired.

Thus with this apparatus the covering of a section with rubber on one hand and the vulcanization of the next section in the direction of travel on the other hand are performed under uniform tension of the steel cables. However, in view of the required closing of the fixed clamps and opening of the movable clamps, it is nevertheless necessary that each section after it has been covered with rubber under tension, be automatically relaxed and freshly tensioned before it is vulcanized. The problem underlying the invention disclosed in German Pat. 1,255,917 to perform the vulcanization of the belt without relaxing the individual steel cable inserts after each section by section vulcanization has therefore not been solved by this apparatus and by the method of manufacture described in this German Pat.

German laid open specification No. 1,579,088 describes a method of vulcanizing a rubber conveyor belt with inserted longitudinally extending steel cables while the individual steel cables are under uniform tension. The utilized apparatus corresponds as to its essential parts to that described in the German Patent No. 1,255,917 referred to above. However, the two fixed clamps are absent, and the first movable clamp, when viewing from the winding-off device for the steel cables, is movable simultaneously with the tensioning device following said first movable clamp.

When making a conveyor belt by means of this apparatus, a tensioned section is vulcanized in the press. Thereupon the tensioned section is displaced by one press length in the direction of travel. In this connection, a corresponding length of non-tensioned steel cables is again drawn off from the winding-off device, the last vulcanized section is pulled out of the press, and the next section counter to the direction of travel is covered with rubber in tensioned condition and is pulled into the press.

In contradistinction to the apparatus according to German Pat. No. 1,255,917, the tensioned steel cable section between the two movable clamps is in this instance selected so long that it meets the device for applying the rubber after the above described process has been repeated a number of times and thus the clamp is placed near the winding-off device for the steel cables or the tensioning device is placed in front thereof. Depending upon the length of the tensioning section available, a piece can be vulcanized by sections which amounts to a multiple of a press length, while the steel cables remain always uniformly tensioned. However, when for the reason stated it is no longer possible for the tensioned section once more to move in the direction of travel, it will also be necessary with this method to release the movable clamps and to return them counter to the direction of travel until the starting point is reached, i.e., the clamp placed in the vicinity of the winding-up drum for the finished belt meets the press. The section which is then located between the movable clamps will, as viewed from the winding-off device for the steel cables, contain the non-tensioned steel cables which have been drawn off and a section covered with rubber located in the press. After the movable clamps have been closed and the individual steel cables have been uniformly tensioned by the tensioning device, the manufacture is continued as above described.

While according to this method of manufacture it is not necessary after each press section to relax a steel cable section corresponding to that length which had previously under tension been covered with rubber and to tension it again for the vulcanization, such a section will nevertheless occur for every few vulcanization sections, and this advantage over the apparatus according to German Pat. No. 1,255,917 is offset by a correspondingly greater requirement of space for the installation in the longitudinal direction.

It is, therefore, an object of this invention so to design an apparatus for manufacturing and vulcanizing a conveyor belt with inserted steel cables, for a stationary arrangement of the vulcanizing press, such that the vulcanization of the belt can be effected without relaxing the individual inserted steel cables each time after the completed vulcanization of a section.

These and other objects and advantages of the invention will appear more clearly from the following specification in connection with the accompanying drawings, in which.

The apparatus according to the invention is characterized primarily in that one movable tensioning clamp is located between the winding-off device and a fixed tensioning clamp, whereas the other movable tensioning clamp is arranged between the other fixed tensioning clamp and the winding-up drum. Furthermore, the tensioning device is arranged between the first mentioned movable tensioning clamp and the first mentioned fixed tensioning clamp.

In this way it will be possible that the steel cable section is located between a movable and a fixed tensioning clamp and is respectively advanced or drawn off in each case. This section after closing the movable clamp can be brought to the same tension as the tensioned section located between the fixed tensioning clamps. When this has occurred, the fixed tensioning clamps can be released without resulting in a relaxation of the steel cables. Thus the covering of the steel cables with rubber is not only always performed under tension, but this tension remains maintained without interruption until the completion of the vulcanization with its resulting anchorage of the steel cables in the rubber.

The solution according to the invention thus avoids the described disadvantages of the heretofore known devices.

Conveniently, the tensioning device is movable in a manner known per se simultaneously with the movable tensioning clamp arranged adjacent thereto so that the cables need not be pulled through the tensioning device in tensioned condition.

Figure 1:
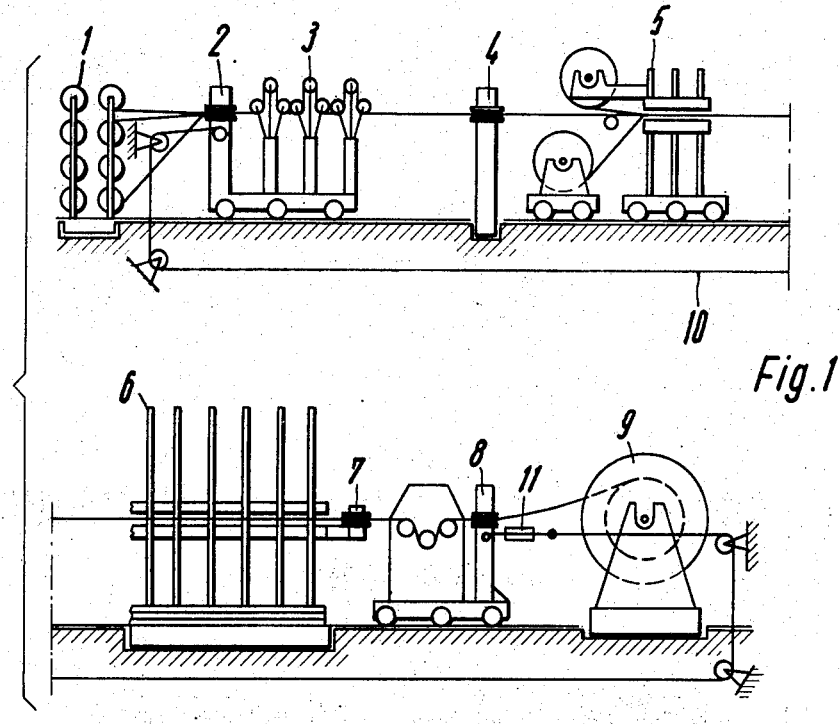
FIG. 1 is a side view of an apparatus according to the invention.
Figure 2:
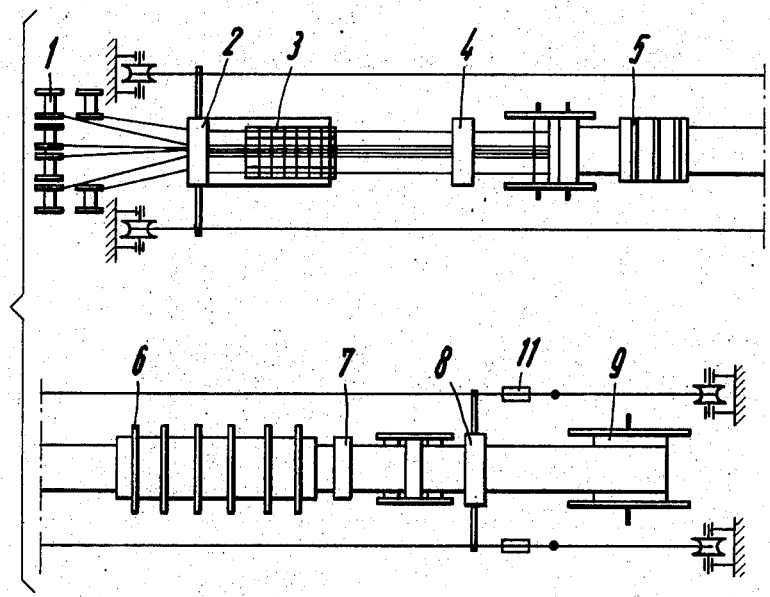
FIG. 2 is a top view of the apparatus according to FIG. 1.

In the apparatus according to FIGS. 1 and 2, the fixed tensioning clamps 4 and 7 are in their illustrated condition shown as being closed, and the steel cable section located therebetween is tensioned. The belt section located in the press 6 is being vulcanized. Thereafter or simultaneously therewith, with the movable tensioning clamps 2 and 8 closed and coupled together by a cable 10 which has a resilient intermediate element 11 for equalizing the length, the sections between the tensioning clamps 2 and 4 and automatically also the sections between the tensioning clamps 7 and 8 are tensioned by the tensioning device 3 to the same extent as the section between the tensioning clamps 4 and 7. To this end, the central roller of the respective roller set of the tensioning device 3 is raised sufficiently for each cable to have the desired tension. Thereupon the tensioning clamps 4 and 7 are relieved. Nevertheless, the tension between the tensioning clamps 2 and 8 is maintained, and the section between these tensioning clamps, after the press 6 has been opened, may be transported under tension by one press length towards the winding-up drum 9. Simultaneously, a finished piece of conveyor belt is wound on to the winding-up drum 9, the last vulcanized belt section is drawn out of the press 6, and a fresh section is covered with rubber by the device 5 and drawn into the press 6. At the same time, a section length of non-tensioned steel cables is drawn off from the winding-off device 1. Thereupon the tensioning clamps 4 and 7 are closed. The movable tensioning clamps 2 and 8 are relieved, returned to their initial position and likewise closed. The process of manufacture is now repeated as described.

Therefore no relaxation of the steel cables occurs from the covering of the tensioned wire cables with rubber up to their final anchorage by the vulcanization, and any possible shifting which might otherwise have resulted prior to the final anchorage of the cables is prevented.

Figure 3:
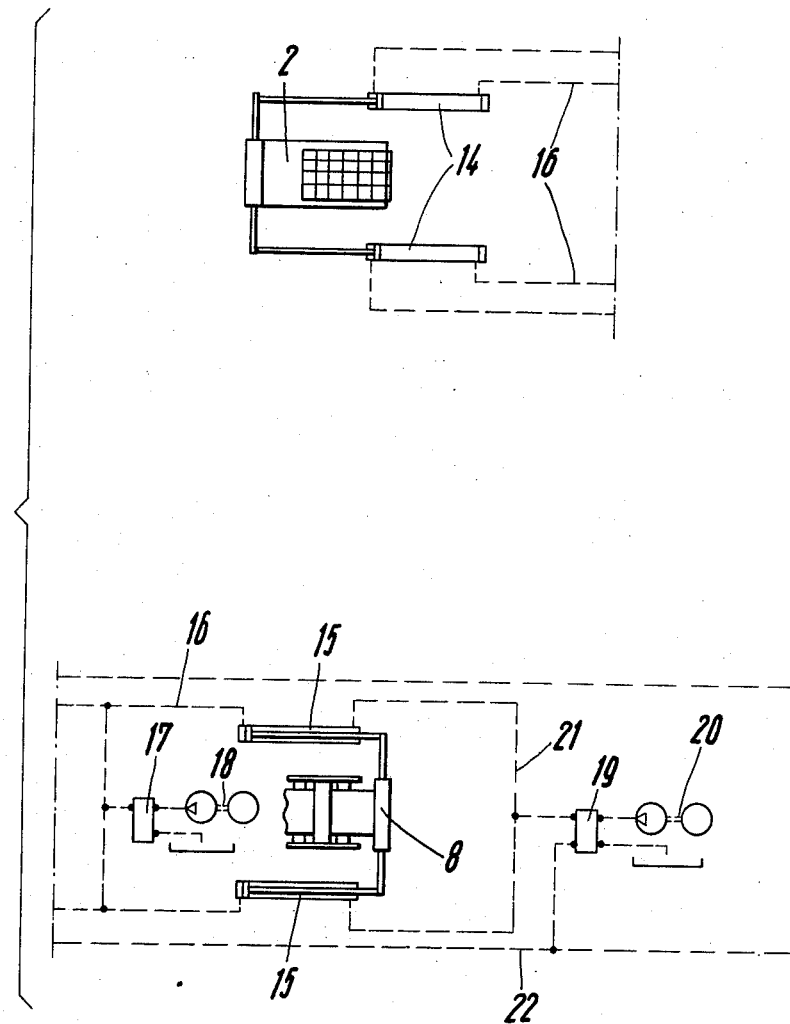
FIG. 3 shows a top view of the hydraulic system for the device according to FIGS. 1 and 2.

FIG. 3 shows a hydraulic arrangement for the apparatus according to the invention. In this instance the traction element comprises two hydraulically or pneumatically operated cylinders 14 and 15 which are in communication with each other through pipes 16. The pistons of the cylinders 14 are connected to the movable tensioning clamp 2, and the pistons of the cylinders 15 are connected to the movable tensioning clamp 8. The cylinders 14 and 15 are maintained under uniform tension through a valve 17 by a unit 18 comprising a pump and a motor. Those ends of the cylinders 14 and 15 which are not connected to each other by the pipes 16 are connected to further pipes 21 and 22 which communicate through a control valve 19 with a unit comprising a pump and a motor.

It is, of course, to be understood that the present invention is, by no means, limited to the particular showing in the drawings but also comprises any modifications within the scope of the appended claims.

What we claim is:

1. An apparatus for making conveyor belts of rubber with longitudinally extending steel cables continuously uniformly tensioned therein, which includes in combination: first and second stand means spaced from each other for respectively delivering steel cables and winding up conveyor belts with said steel cables incorporated therein, first and second movable clamping means connected to each other for synchronous movement with each other and arranged between said first and second stand means, first and second fixed clamping means arranged in spaced relationship to and between said first and second movable clamping means and also being spaced from each other, tensioning means interposed between said first movable clamping means and said first fixed clamping means for individually tensioning cables passing from said first movable clamping means to said first fixed clamping means, rubber applying means interposed between said first and second fixed clamping means for applying rubber material to and around cables passing from said first fixed clamping means to said second fixed clamping means, a press interposed between said first and second fixed clamping means for vulcanizing the thus obtained rubber structure around the respective cables, and means associated with said second stand means for winding up the thus vulcanized belt structure.

2. An apparatus in combination according to claim 1, in which said tensioning means is movably connected to said first and second movable clamping means to move together therewith.

3. An apparatus in combination according to claim 1, which includes conveying means connecting said first and second movable clamping means.

4. An apparatus in combination according to claim 3, which includes length compensating means interposed in said conveying means.

5. An apparatus in combination according to claim 4, in which said length compensating means includes fluid operable intermediate means.

6. An apparatus in combination according to claim 4, in which said length compensating means includes resilient means.

7. An apparatus in combination according to claim 2, in which said conveying means includes fluid operable cylinder piston means, conduit means interconnecting said fluid operable cylinder piston means, valve means associated with said conduit means, and pump and motor means connectable to said valve means for maintaining said cylinder piston means through said valve means at a substantially uniform pressure.

8. An apparatus in combination according to claim 7, in which said cylinder piston means is double-acting, and in which said conduit means interconnect only one end of said cylinder piston means, additional conduit means being provided for interconnecting the other ends of said cylinder piston means, control valve means being associated with said additional conduit means, and additional pump and motor means communicating with said control valve means.

* * * * *